Sept. 29, 1959 R. T. ROSTEN ET AL 2,906,332
CONTROLS FOR WATER SOFTENING APPARATUS AND SYSTEM
Filed July 12, 1956 7 Sheets-Sheet 1

INVENTORS:
Randolph T. Rosten
and Philip W. Rosten
By Jones, Tisch & Darbo
Att'ys.

INVENTORS:
Randolph T. Rosten
and Philip W. Rosten
By Jones, Tesch & Darbo
Att'ys.

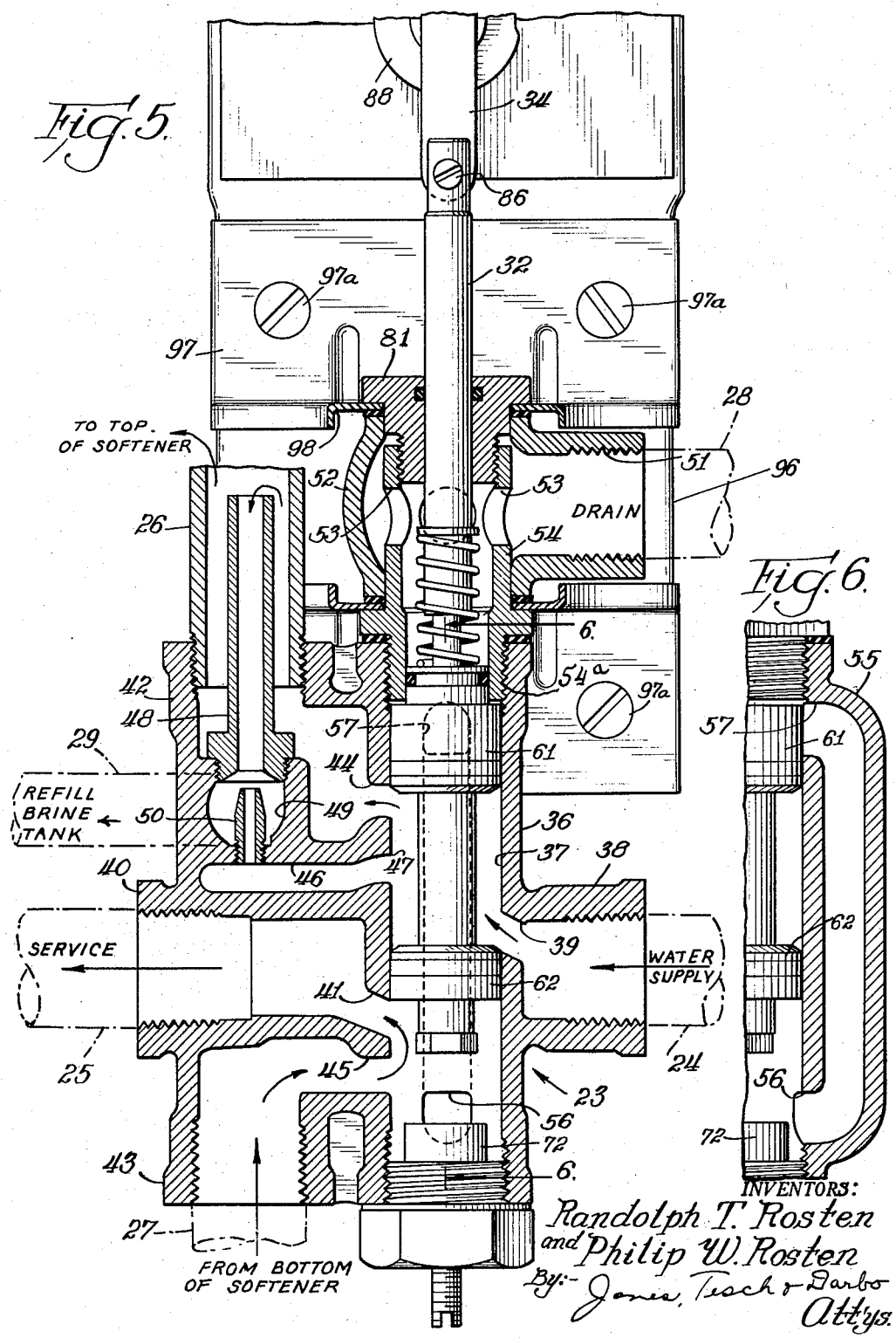

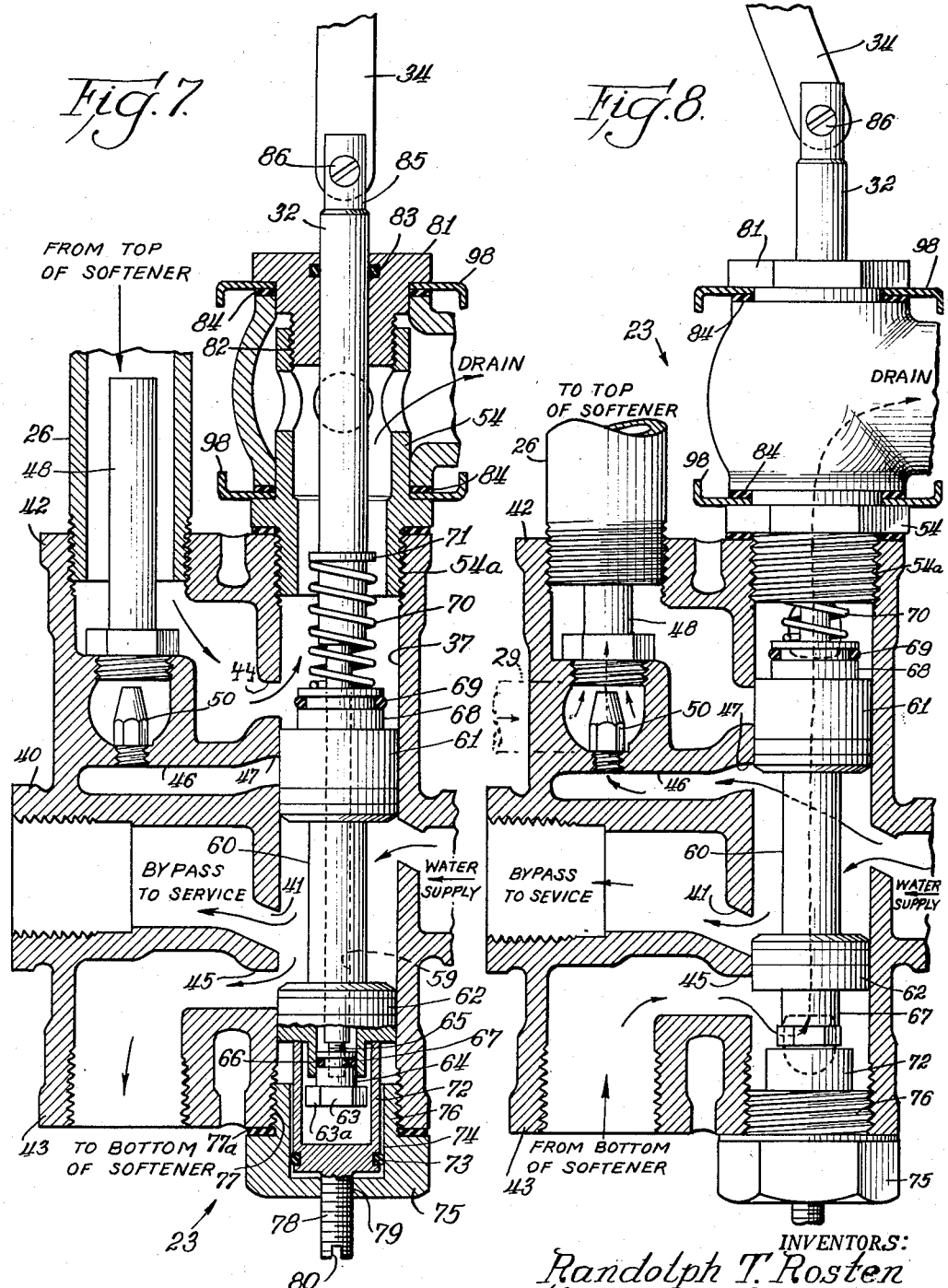

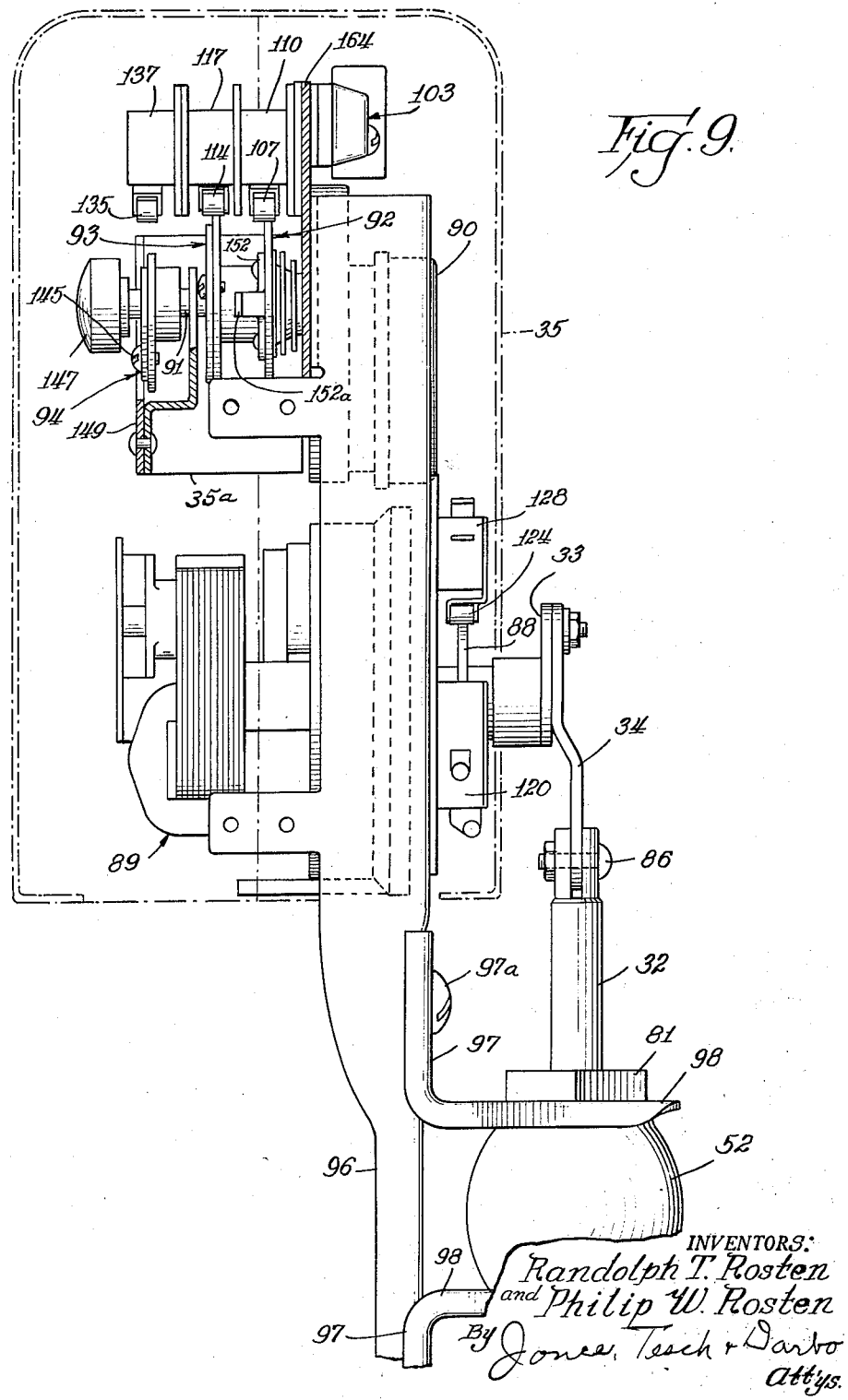

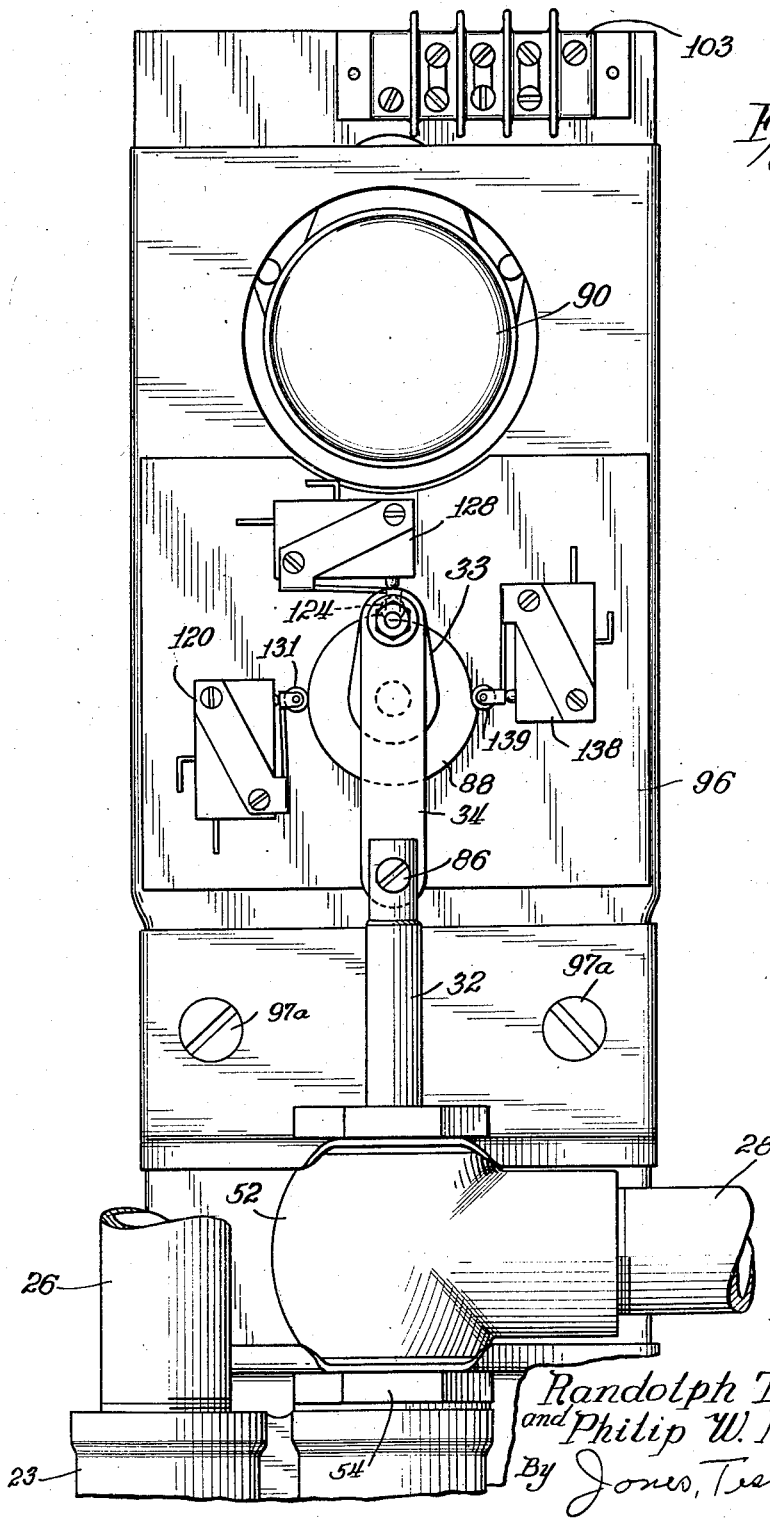

Sept. 29, 1959  R. T. ROSTEN ET AL  2,906,332
CONTROLS FOR WATER SOFTENING APPARATUS AND SYSTEM
Filed July 12, 1956  7 Sheets-Sheet 7

INVENTORS:
Randolph T. Rosten
and Philip W. Rosten
By Jones, Tesch & Darbo
Att'ys.

United States Patent Office 2,906,332
Patented Sept. 29, 1959

2,906,332

CONTROLS FOR WATER SOFTENING APPARATUS AND SYSTEM

Randolph T. Rosten and Philip W. Rosten, Madison, Wis., assignors to Capital Plating & Machine Co., Madison, Wis., a co-partnership Application July 12, 1956, Serial No. 597,459

9 Claims. (Cl. 161—7)

This invention relates to controls for water softening apparatus and system and aims to provide electrical controls therefor which may be set off either by clock mechanism or manually and which in either case provide improved and automatically correlated steps of operation in connection with improved unitary valving means.

An object of the present invention is the provision of separate circuits for the three different positions of the valving means, and specifically a tri-circuit control representing each of the sequential steps of, service, backwash and regeneration respectively, so that the controls are positive and "fool-proof" requiring a minimum of installation labor and experience, and minimizing service calls, while guarding against tampering or incorrect adjustment, the system automatically restoring itself to correct operation conditions at all times.

In an important aspect, the present invention makes possible the use of a valve of the piston type with automatic controls therefor and the recognized advantages attendant upon a valve of this type.

The invention will be understood and objects and advantages thereof will be explained by reference to the illustrative construction and manner of operation shown in the accompanying drawings and the following description, taken together with said drawings in which—

Figure 5 is an axial section of the illustrative valving means in the service position, substantially enlarged;

Figure 6 shows a detail of Figure 5;

Figure 7 is a fragmentary view somewhat similar to Figure 5 showing the valving means in the backwash position;

Figure 8 is another similar view showing the valving means in the regeneration position;

Figure 9 is a side elevational view of the controls mounting and control shown diagrammatically in Figures 2, 3 and 4 and showing also the connections between the control and the valving means;

Figure 10 is a rear elevational view of the structure of Figure 9;

Figure 2:
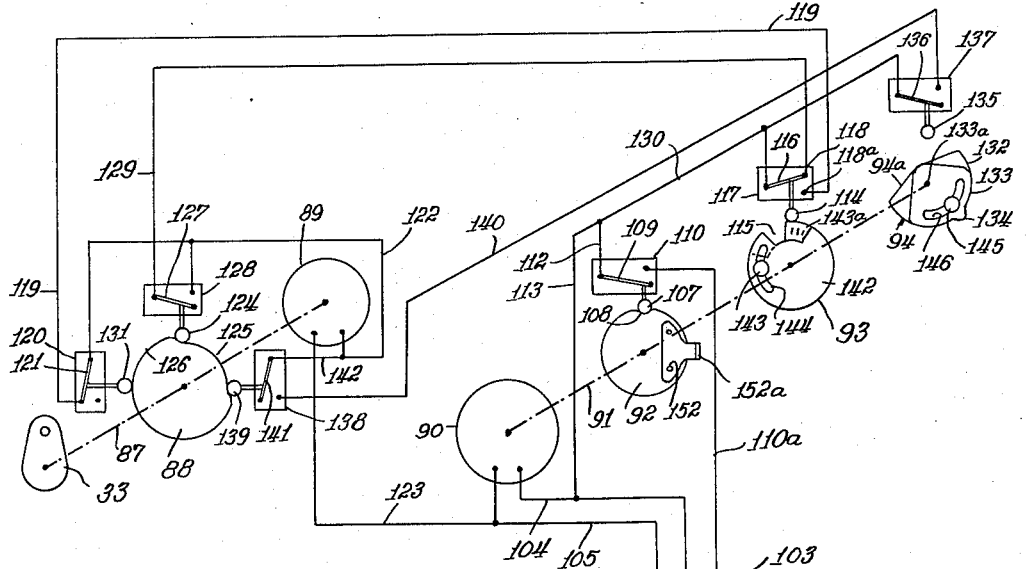
Figure 2 shows, schematically, controls for the valving means, and an electrical circuit diagram in the "service" position of the valving means.

Referring in detail to the drawings, the apparatus disclosed for illustrative purposes may be characterized as of the regeneration type in which a chemical, known to the trade as zeolite, is used in the softener tank. The cycle of operation here illustrated is that in which water supply, as drawn for example from the city main, passes through the valving means to the top of the softener tank, where it passes downwardly to the zeolite bed and then back from the bottom of the softener tank to the valving means, from which it is delivered to the service pipe. At predetermined or selective intervals of time, a second step occurs for a relatively short period where a part of the water from the water supply passes from the valving means to the bottom of the softener tank, then upwardly through the softener tank where it acts as a backwash, loosening and fluffing up the zeolite, so to speak, preparing it for the regeneration step, and then passes from the top of the softener tank back to the valving means from which it passes to the drain. During the backwash step a portion of the water from the water supply is bypassed from the main directly to the service pipe so that the household will not be without water.

A third step which is of somewhat longer duration than the backwash step is the regeneration step in which water from the water supply passes through the valving means to the top of the softener tank while drawing and carrying with it brine from the brine tank to regenerate the zeolite, by a reverse action, as is well known to the art, by the addition of common salt, the brine laden water returning from the bottom of the softener tank to the valving means from which it passes into the drain. A brine valve is arranged to be closed by a float to discontinue the drawing of brine from the brine tank when the brine level drops to a predetermined level, a short rinse occurring thereafter. During the regeneration step, also a portion of the water from the main is bypassed to the service pipe.

Upon initial return of the valving means to service position, a portion of the water from the water supply is diverted to the brine tank until the liquid level in the brine tank is restored to the desired height, upon which occurrence a float actuated valve in the brine tank cuts off the flow of water thereto.

Figure 1:
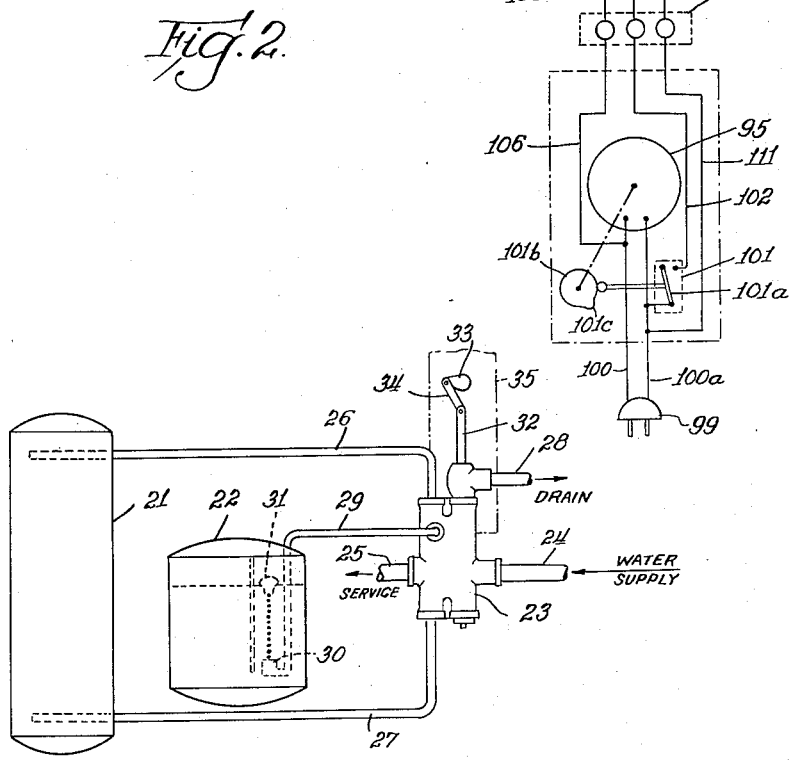
Figure 1 shows an illustrative water softener system and valving means with which the present invention is concerned.

Referring to the somewhat schematic drawing shown in Fig. 1 of an apparatus and system with which the present invention is concerned, numeral 21 indicates the softener tank for the zeolite bed, 22 the brine tank, and 23 the main valving means. 24 is the raw water supply pipe or main and 25 the service pipe to the household faucets. 26 is a pipe from the valving means 23 to the top of the softener tank, and 27 is a pipe from the valving means to the bottom of the softener tank. 28 is a pipe from the valving means to the drain, and 29 is a pipe from the valving means which enters the top of the brine tank and passes downwardly therethrough to the brine valve 30 which is controlled by a float 31. 32 is the valve stem for the valving means 23, which is controlled by a crank 33 and pitman 34 driven by power transmission mechanism under the influence of controls mounted in casing or frame 35, as later explained.

In accordance with the present invention and turning first to a description of the main valving means 23, as best seen in Figs. 5, 6, 7, and 8, the valve body 36 of the valving means has a central valve bore 37 that is in communication with the water supply inlet 38 to which the water supply pipe 24 is connected, this communication being afforded through the port 39. On the opposite side of the valve body 36 is the outlet 40 to which the service pipe 25 is connected, the outlet 40 being in communication with the valve bore 37 through the port 41. An integral hollow boss 42 receives the pipe 26 and another integral hollow boss 43 the pipe 27. The hollow boss 42 is in communication with the valve bore 37 through the port 44 and the hollow boss 43 is in communication therewith through the port 45. Also in communication with the bore 37 is a passageway 46 by port 47 just below port 44. Spaced interiorly of the hollow boss 42 is a suction tube 48 that upstands from and communicates with a cavity 49 in the valve body to which the brine tank 22 is connected by pipe 29. The valve passage 46 is immediately below the cavity 49 and communicates therewith through jet nozzle 50 that is aligned with the suction tube 48 and directed upwardly thereinto.

At the top of the valve body 36, the drain outlet 51 connects with the drain pipe 28 and is in communication, through a valve bonnet 52 and ports 53 in a valve throat piece 54, with the valve bore 37 in one position of the valving means. The throat piece 54 has a threaded shank that screws into threads 54a in the upper end of the valve bore 37. A bypass conduit 55 (Fig. 6) communicates at its lower end by port 56 with the lower end of the valve bore 37 adjacent the port 45, and, at its upper end, by port 57 with the upper end of the valve bore 37 just above the port 44. An octagonally headed gland 81 (presently more particularly described) slidingly passes the valve stem 32 into the valving means. At its lower end the valve stem 32 is reduced in diameter as at 59 (Fig. 7) where it slidingly carries thereon a sleeve 60 that has a pair of piston valves 61 and 62 fixed thereon at the upper and lower ends of the sleeve 60 respectively.

The sleeve 60 with the valves 61 and 62 fixd thereon is movable with respect to the lower end 59 of the valve stem 32, being held on the valve stem at its lower end by a ferrule 63 that has a non-circular head 63a and a reduced portion 64 that has a tapped bore and is screwed onto the threaded termination 65 of the valve stem, an O-ring seal 66 being located on the portion 64 which is snugly received in the barrel-like dependent extension 67 of valve 62 when the sleeve and valves are at their lower position on the valve stem.

Further in accordance with the present invention, at the upper end of the sleeve 60 the valve 61 has an upward extension 68 that carries an O-ring seal 69 and a compression coil spring 70 abuts extension 68 at one end and a collar 71 on the valve stem 32 at the upper end of the spring. When the valve stem is raised, as later described, the valve stem first moves upwardly with respect to the sleeve 60 and valves 61 and 62 until the head 63a of the ferrule 63 abuts the valve extension 67 whereupon the valves move upwardly with the valve stem. In the reverse direction, that is, upon downward movement of the valve stem, the valve stem and sleeve 60 move downwardly together in the valve bore 67, this simultaneous movement being urged by the spring 70, but, when the valves 61 and 62 reach their predetermined lowermost position in the valve bore, the valve 62 abuts the limit cup 72 that receives the valve extension 67 and ferrule 63, while further downward movement of the valve stem 32 is permitted by relative movement between the valve stem and the sleeve 60 with its valves 61 and 62, the spring 70 yieldingly compressing more or less for this purpose. The valve limit cup 72 carries an O-ring 73 on its periphery and is received in the interior 74 of the closure 75 for the bore 37 at its lower end that has an enlarged head and reduced shank 76 exteriorly threaded to screw into the threads 77 in the valve bore 37, a gasket 77a being interposed. Limit cup 72 has a depending threaded shank 78 that passes threadedly through the closure 75 at 79 and has a tool-engaging formation such as the kerf 80 at its lower end in which a screw-driver may be inserted. By screwing the shank 78 upwardly in the closure 75, the limit cup 72 may be adjusted to regulate the lowermost positions of the valves 61 and 62 in the valve bore. The yielding mounting of the valves on the valve stem just described provides accommodation to variations in the connection of the valve stem 32 to pitman 34.

At the upper end of the valving means, the gland 81 closes the valve bore 37 and has a depending reduced threaded shank 82 that passes through the upper end of the bonnet 52 and threadedly engages the throat piece 54 into which it screws, the gland 81 having a sealing O-ring 83 therein which encircles the valve stem slidingly thereat. Gaskets 84 at the upper and lower ends of the valve bonnet 52 effect a seal between the bonnet and the gland and between the bonnet and the valve throat piece. Bracket parts 98 are also clamped thereat as later referred to.

The valve stem 32 has a reduced upper end 85 above the valving means 23 that is articulated by pintle 86 with the valve crank pitman 34, for novel actuation as next described.

Turning now to a description of the controls for the valving means 23, and referring to Fig. 2, on the shaft 87 of the crank 33 is fixed a valve wheel cam 88, the shaft 87 being the output shaft of a valve motor 89. The shaft 87 is suitably geared in the motor 89 so that the valve cam 88, if it ran continuously, would make one revolution per minute, but, as here arranged, it takes 53 minutes for the valve cam 88 to make one indexed rotation including stopping and starting of the motor 89 and with it the cam 88 as presently described. Stopping and starting of the motor 89 is controlled in part by a control motor 90 on the output shaft 91 of which are fixedly arranged a plurality of control discs 92, 93, and 94. The control motor 90 is here arranged to run for a period of 90 minutes, during which time the valve motor 89 is started and stopped so as to run through a cycle of operation represented by one revolution of the valve cam 88, and which, in turn, means movement of the valving means 23 from its normal service position (Fig. 5), to its back wash position (Fig. 7), then to its regeneration position (Fig. 8), and back to service, the excess of 37 minutes in this instance over the 53 minutes for one rotation of the cam 88 being provided as a margin of safety to insure that the movements of cam 88 have been completed before the circuit to the control motor 90 is discontinued. It will be understood that these illustrative periods could be varied by varying the gearing from the motors 89 and 90 to their respective output shafts 87 and 91.

Starting of the control motor 90 for the cycle of operation, from Fig. 5, through Figs. 7 and 8 and back to Fig. 5, may be initiated electrically at intervals of say, one week to twelve days, by a clock mechanism 95. Suitable mounting for the clock mechanism 95 on the frame 35 need not be shown since this is conventional, but the valve motor 89 and its associated parts and the control motor 90 and its associated parts are shown mounted (Fig. 9) on the frame 35 through the intermediation of bracket 96. By means of a pair of clips 97 fastened to the bracket 96 by screws 97a and having horizontal portions 98 that clamp between them the valve bonnet 52, the valving means 23 is also supported by the frame 35. (See also Figs. 5, 7 and 8.)

The clock mechanism 95 is shown connected by the plug 99 and wires 100 and 100a with the usual house current. When the plug 99 is pushed into a wall outlet the clock mechanism 95 will run continuously. Connected to the line 100a is a switch 101 that has a movable element 101a that is controlled by a cam 101b that turns with the clock mechanism, making one revolution in the predetermined interval above referred to, of, say, a week to twelve days, and having a cam bulge 101c thereon that depresses the moveable current carrying element 101a to close the switch 101 that then makes a contact with a wire 102 and through a multiple connector block 103 with a line 104 that leads to one side of the control motor 90. The other side of the control motor 90 is connected with a line 105 and through the terminal block 103 with a line 106 connected to the wire 100, which is always electrically connected with plug 99. As soon as the moveable element 101a closes a circuit through the line 102, the control motor 90 has a circuit completed therethrough and starts to run, and starting of motor 90 starts to rotate the control discs 92, 93 and 94 which are fixed on the output shaft 91 of the control motor.

The shaft 91 and control discs run in a clockwise direction as viewed in Fig. 2. As soon as the disc 92 makes a short turn, the follower 107 of switch 110 is moved out of the cam notch 108 in the disc 92 and this moves the movable current carrying member 109 of the switch 110 to a position where it makes contact with the line 110a that is connected through the terminal block 103 with another line 111 that is connected with the line 100a. Follower 109 is connected, through the wires 112 and 113, with the line 104 to the motor 90, so as to maintain a circuit through the motor 90 when the cam bulge 101c of the cam 101b of the clock mechanism 95 rides off the moveable member 101a of the switch 101 to open this switch. This keeps the motor 90 running after the switch 101 is opened. The motor 90 will continue to run for the 90 minute period referred to, i.e., until the notch 108 of the disc 92 returns to the position shown in Fig. 2 when the follower 107 can again enter this notch thereby opening the switch 110.

At the same time that the control disc 92 begins to rotate, control disc 93 also begins to rotate and follower 114 that rides the periphery of the disc 93 drops into the gap 115 in this disc. This permits the moveable element 116 of the double throw switch 117 to break contact with the contact 118 and to make contact with the contact 118a of this switch, thus connecting the wire 130 with the wire 119, that, in the closed position of the switch 120 associated with the cam wheel 88, is connected through the moveable current carrying element 121 with the line 122 to one side of the valve motor 89, the other side of the valve motor 89 being connected by the line 123 with the line 105 which is always in electrical connection with the wire 100 to the plug 99. Thus a circuit is completed to the motor 89 through wire 122, switch 120, line 119, moveable member 116 of switch 117, wire 130, wire 112, moveable element 109 of switch 110, and wires 110a and 111 to plug 99. Motor 89 is thus started and with it valve cam 88 starts to rotate in a clockwise direction. Slight rotation of cam 88 causes follower 124 of switch 128 to ride out of cam depression 125 in the periphery of cam 88 and onto the cam rise 126 of cam 88, which raises follower 124 and causes moveable element 127 of switch 128 to close this switch. Wire 129 connected to element 127 of switch 128 is connected to contact 118 of switch 117 which at this time is out of contact with the moveable element 116 of this switch 117.

Figure 3:
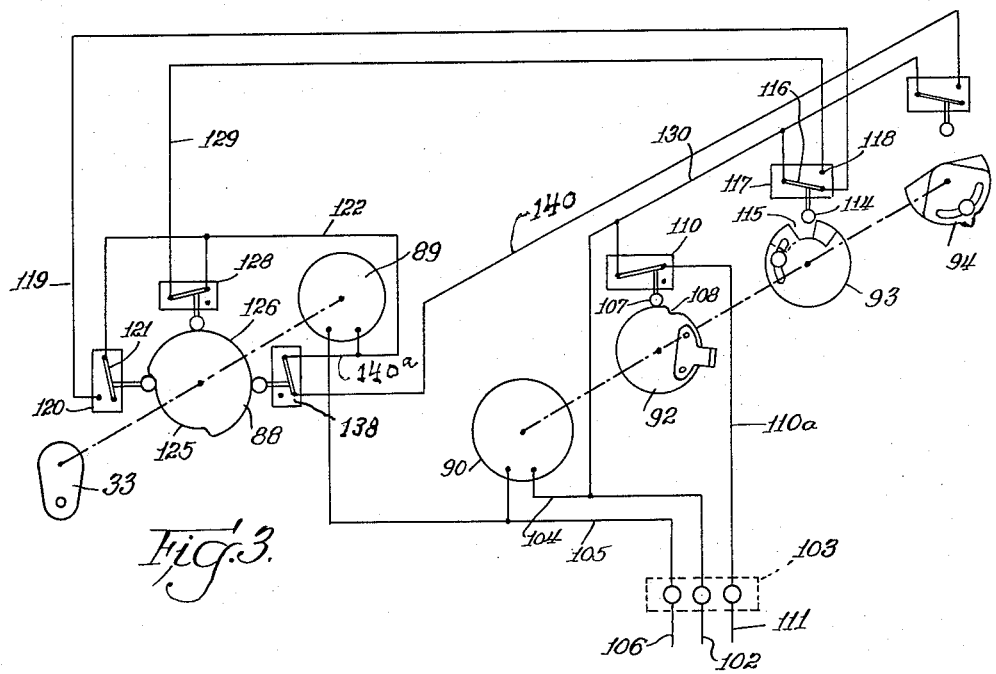
Figure 3 is a view somewhat similar to Fig. 2 but showing the controls in the "backwash" position of the valving means.

As cam 88 continues to rotate, crank 33 rotates with it from the position shown in Fig. 2 to the position shown in Fig. 3 which through valve pitman 34 moves valve stem 32 downwardly to its lowermost position shown in Fig. 7, thus establishing the backwash step of the apparatus. Rotation of cam 88 from the position of Fig. 2 to the position of Fig. 3 takes one-half minute, represented by a 180 degree rotation of the cam 88. The valving means 23 is held in the position of Fig. 3 for approximately seven minutes. For this purpose, valve motor 89 is stopped by reason of the fact that moveable member 121 of limit switch 120 breaks contact with the line 119 by reason of the fact that the follower 131 of this switch has now dropped into the cam depression 125 of the cam 88. Opening of the switch 120 thus breaks the circuit to one side of the motor 89 through the line 122.

The duration the backwash step is determined by the width of the gap 115 in the disc 93, which gap is adjustable as later described. As this disc continues to rotate, follower 114 of the switch 117 will ride out of the gap 115 and back onto the periphery of the disc 93. This will move moveable element 116 of the double throw switch 117 back into contact with the contact 118 of this switch, and, since the switch 128 is now closed, will reestablish the circuit to the motor 89 through wire 122, switch 128, line 129, element 116 of switch 117, line 130, switch 110, wires 110a and 111. Thereupon the motor 89 will restart and rotate the cam 88 and with it crank 33 from this position shown in Fig. 3 to that shown in Fig. 4.

Figure 4:
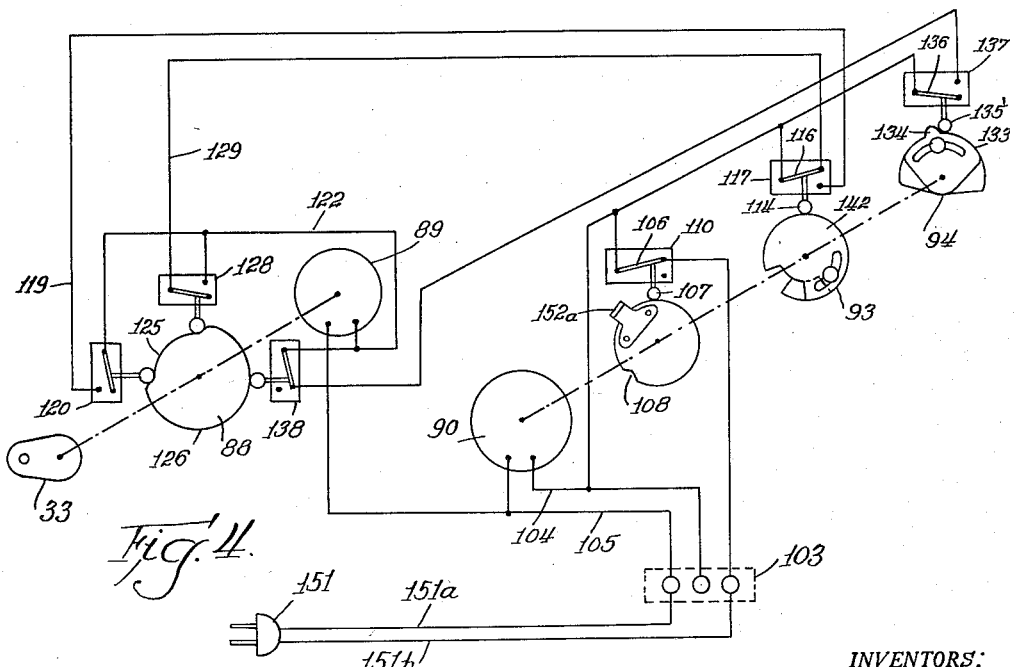
Figure 4 is another view somewhat similar to Figs. 2 and 3 showing the controls in the "regeneration" position of the valving means just prior to the return to service position, this figure also showing the omission of one of the expedients in the completely automatic control system shown in Fig. 2.

Rotation of the cam 88 from the position of Fig. 3 to the position of Fig. 4 takes one-quarter minute, represented by a 90 degree revolution of the cam 88. This brings the valve crank 33 to its position of 270 degrees revolution and raises the valve stem 32 from the position shown in Fig. 7 to its position shown in Fig. 8, in which the regeneration step is established, and this stage continues for a period of approximately 45 minutes. This period is also adjustable as presently described. Cam 88 will stop in the position of Fig. 4 by reason of the fact that when the cam gets to this position follower 124 of limit switch 128 will ride off the cam rise 126 of the cam 88 and drop into the cam depression 125, thus opening switch 128 and breaking the circuit to the motor 89 through line 122, so as to allow a suitable period for the regeneration stage.

The length of time that the valving means 23 will stay in the regeneration position is determined by the control disc 94. Control disc 94 as will be seen is not a complete disc but is segmented as of 94a so that in the position of this disc 94 shown in Figs. 2 and 3 its periphery 132 defines an arc of a circle which is on the lower side of this disc. The disc also carries an adjustable sector 133 pivoted at 133a on the segment 94a and which in turn carries a cam tit 134 that after predetermined rotation of the disc from its position shown in Fig. 4 is ready to limit the duration of the regeneration step to the predetermined period already referred to, rotation of the cam tit 134 to this position from its position shown in Fig. 3 taking just short of 45 minutes.

Further rotation of the control disc 94 from the position shown in Fig. 4 causes the cam tit 134 to raise follower 135 of switch 137 thus causing moveable member 136 of this switch to close a circuit through this switch. Prior to this occurrence and immediately upon cam 88 making its initial quarter-turn from its position shown in Fig. 2, switch 138 associated with cam 88 has been closed by reason of the follower 139 of this switch riding out of the cam depression 125 onto the cam rise 126 of the cam 88. This as shown in Fig. 3 has caused a wire 140 to be connected through moveable element 141 of switch 138 and wire 140a with the line 122. Upon the closing of switch 137 a circuit is established to motor 89 through wire line 122, wire 140a, switch 138, wire 140, switch 137, wire 130, switch 110 and wires 110a and 111. This re-starts motor 89 and moves cam 88 and with it crank 33 from the position shown in Fig. 4 and causes the crank 33 to make its final one-quarter revolution, taking one-quarter minute, back to its position shown in Fig. 2. This brings the valving means 23 from its regeneration position shown in Fig. 8 back to its position shown in Fig. 5 and reestablishes the service position of the valving means.

When cam 88 has completed its last one-quarter revolution, follower 139 of limit switch 138 will ride off the cam rise 126 of cam 88 into cam depression 125, thus opening the switch 138 and breaking the circuit to the motor 89, stopping this motor at the position of Fig. 2 and leaving the valving means 23 in the service position of Fig. 5. At approximately the same time, follower 135 of switch 137 will ride off the cam tit 134 of the disc 94 and open the switch 137 in preparation for the next cycle.

All three of control discs 92, 93 and 94 will continue to rotate for approximately another 37 minutes as previously explained and until the disc 92 has rotated to the position shown in Fig. 2 in which the cam notch 108 again receives the follower 107 of the switch 110 and opens this switch, thus breaking the circuit to the motor 90, which will not again be established until the clock mechanism 95 closes the switch 101 to give the motor 90 sufficient actuation to give the disc 92 a slight turn to raise the follower 107 out of the notch 108 and close the switch 110.

For adjustment of gap 115, overlapping segment 142 of disc 93 may be adjusted as by a screw 143 on the main segment 143a of this composite disc 93, screw 143 playing in an arcuate slot 144 in the segment 142. Thus the gap 115 may be adjusted to predetermine the backwash interval within a range from zero to fifteen minutes. If the gap 115 were completely closed the duration would be zero and there would be no backwash and the valving means would go directly from the service position to the regeneration position. If it were completely open there would be fifteen minutes backwash. It is here shown adjusted for about seven minutes of backwash.

Similarly, sector 133 of the disc 94 may be adjusted on main part 94a of the disc 94 by means of a set-screw 145 that plays in an arcuate slot 146 in the sector 133. This determines the position of the cam tit 134 on the periphery of the disc 94 and determines the duration of the regeneration stage, which as here indicated, is adjusted for about 45 minutes.

Figure 11:
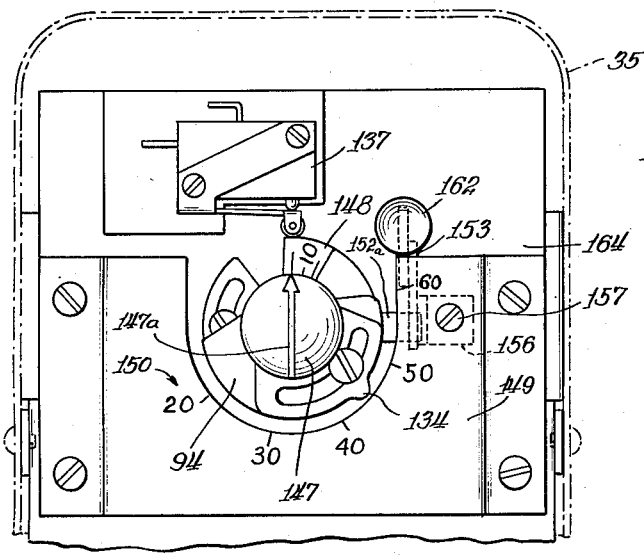
Figure 11 is a fragmentary front elevational view of the upper portion of Fig. 10.

Segment 143a of the cam disc 93 conveniently has dial graduations 148 (Fig. 11) on its face indicating selective settings for the backwash stage duration by adjustment of the width of the gaps 115. Motor casing 149 may similarly carry the dial graduations 150, as here shown from twenty to sixty minutes, indicating selective settings for the regeneration stage duration by adjustment of the location peripherally of cam tit 134.

On the back of the motor 90 is conveniently located a knob 147 (Fig. 11) that may be used by a service attendant or by the householder to rotate the shaft 91 of the motor 90 manually for the purpose, say, of testing the system, by bringing the control disc 92 to a position lifting the follower 107 out of the cam notch 108 to close the switch 110 independently of the clock mechanism 95, which would initiate the cycle already described. The service knob 147 desirably has an arrow 147a on its face which indicates the position of the knob when the follower 107 of the switch 110 is in the cam notch 108 to shut off the control motor 90.

As suggested in Fig. 4, the electric clock mechanism 95 may be eliminated with its associated switch 101, and, in lieu thereof, the plug 151 may have its wires 151a and 151b directly connected through the terminal block 103 with the wires 105 and 110a of the system respectively. In such case, initiation of the cycle may be accomplished manually either by turning the knob 147 or by a push button arrangement next described, in either case to rotate the disc 92 just sufficiently to close switch 110 and start the control motor 90.

Figure 12:
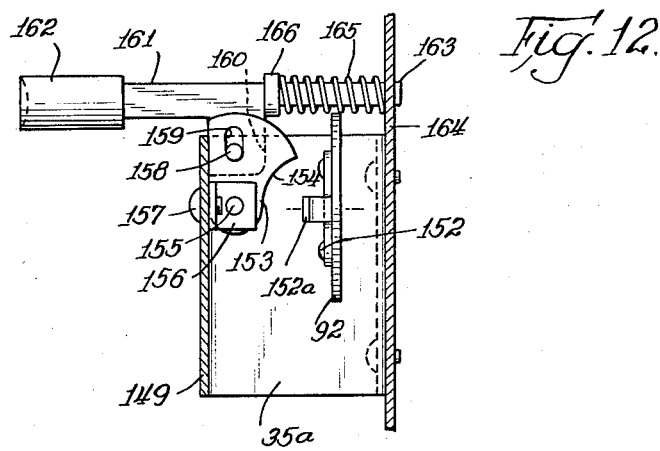
Figure 12 shows an expedient for manual initiation of the electrical controls when the fully automatic control is not employed.

As shown in Fig. 12, disc 92 has rigidly secured thereto, as by screws 152, at a position approximately 90 degrees clockwise from the notch 108, a lug 152a which is forwardly offset from the plane of the disc 92 so as to be engageable by a dog 153 that has a concave edge 154 giving it a somewhat falcate shape and that is pivoted at 155 on a bracket 156 secured as by screw 157 to the wall 149 of the sub-frame 35a of frame 35 that carries motor 90 and discs 92, 93 and 94. Associated with the dog 153 is a plunger 161 that carries a push button 162 and that passes through a slot 163 in the partition 164 of frame 35. Plunger 161 has a depending bib 160 that carries a stud 158 that plays in a slot 159 in dog 153. Between the partition 164 and a collar 166 on the plunger is a light compression coil spring 165 that urges the plunger in a direction in which the dog 153 is separated from the lug 152a. When, however, the plunger 161 is pushed inwardly, by means of the push button 162, against the resilience of the spring 165, the dog 153 is rotated on its pivot 155 and its edge 154 is brought into engagement with the lug 152a thereby pressing downwardly on this lug and rotating the disc 92 sufficiently to move the follower 107 of the switch 110 out of the notch 108 and thus closing the switch 110 to start the motor 90 and initiate the cycle.

Switches 101, 110, 117, 120, 128, 137 and 138 are desirably of the micro-switch type, an example of which is shown in patent to McGall 1,960,020 of May 22, 1934. It will be understood that the follower of each of these switches is resiliently urged toward its respective cam or control disc so as to tend to ride the periphery thereof.

Operation of the apparatus, under the controls of the present system, is as follows:

When, in the service stage, the valve cam 88 and valve crank 33 are in the position shown in Fig. 2 and the valving means 23 is in the position shown in Fig. 5, water from the water supply pipe 24 passes through the port 39 into the valve bore 37 and from there into the softener 21 through the port 44 and the pipe 26. For a short time at the beginning of this service step, a portion of the water supply entering the port 44 flows downwardly through the tube 48 and into the cavity 49 from where it flows through the pipe 29 to replenish the water supply in the brine tank. This flow, however, is of relatively short duration and is only until the float valve 31 of the brine tank 22 rises to the level shown in Fig. 1 to shut brine valve 30. Normally, water entering the pipe 26 from the valving means flows through the softener tank 21, and downwardly through the zeolite bed where undesirable chemicals are removed, returning to the valving means through the pipe 27, from which it passes through the port 45 into the bore 37 and then through the port 41 into the service pipe 25 to supply the household faucets. This service stage obtains until the zeolite requires regeneration and until the backwash and regeneration steps are initiated by the output shaft of the timing control motor 90 being given an initial rotation either electrically or manually, as already explained.

In the position of the cam 88 and crank 33 shown in Fig. 3 and in the position of the valving means 23 shown in Fig. 7, which is the backwash stage, water entering from the main supply pipe 24 passes into the valve bore 37 through the port 39 and through the port 45 to the pipe 27, thence into the lower part of the water softener tank 21 where it will pass upwardly through the zeolite bed, returning to the valving means through the pipe 26 and passing through the port 44 to the valve bore 37. This backwash water will pass upwardly through the bore 37, through the ports 53 in the throat piece 54 and out through the drain pipe 28. During this backwash step, so as not to leave the house faucets without water, a portion of the water entering the bore 37 from the supply pipe 24 will be bypassed through the port 41 to the service pipe 25. At this time the valve 61 maintains the ports 44 and 47 closed, and the valve 62 closes the lower port 56 of conduit 55.

In the regeneration stage, the cam 88 and the crank 33 occupy the positions shown in Fig. 4 while the valving means occupies the position shown in Fig. 8. At this time, water entering from the main water supply pipe 24 will enter the bore 37 of the valving means through the port 39 and will pass through the port 47 to the passage 46, the port 44 at this time being closed by the valve 61. Water under pressure will then be forced through the jet nozzle 50 to the suction tube 48 creating a low pressure area in the cavity 49 and thereby drawing brine by suction through the pipe 29 from the brine tank 22. The brine will flow upwardly through the suction tube 48 to the pipe 26 and from thence to the top of the softener tank 21 where it will flow downwardly through the zeolite, returning to the valving means through pipe 27 and the port 45. By reason of the position of the valve 62 the brine cannot enter the service pipe 25 but will enter the lower port 56 of the bypass 55 to pass upwardly through the bypass, out through the port 57 thereof to the valve bore 37, and through the port 53 and the throat piece 54 to the drain pipe 28. At the end of the regeneration step, when the float valve 31 in the brine tank 22 drops by the lowering of the level of brine therein to close the brine valve 30, withdrawal of brine through the pipe 29 will cease, but water for rinsing purposes will continue to flow through the circuit just described for a limited period and until the valve motor 89 is actuated as already described to bring the valving means back to the position of Fig. 5. In this regeneration and rinse stage, a portion of water from the water supply pipe 24 will pass through the port 41 from the valve bore 37 and will enter the service pipe 25 to supply the household faucets, the port 41 being partially opened by the valve 62 at this time.

Thus, as here exemplified, during the ninety minute rotation of the control motor output shaft 91 representing a complete cycle, the following timed periods occur: valving means 23 moves from position of Fig. 5 to position of Fig. 7 in ½ minute, remains in that position for 7 minutes, moves to position of Fig. 8 in ¼ minute, remains in that position for 45 minutes, and moves back to position of Fig. 5 in ¼ minute, a total of 53 minutes.

It will be understood that the zeolite tank 21, brine tank 22, brine valve 30 and float valve 31 are of conventional construction, well known to the art, and need not be here further described.

So constructed and arranged, there is here provided an improved and fool-proof control system for a water softener apparatus, one of the advantages of which is that it is difficult to throw the mechanism out of cycle since if this be accidentally done, the apparatus will automatically restore itself to the correct sequence of steps to maintain the proper cycle.

The invention is not intended to be limited to details of construction shown for purposes of exemplification and such changes, including additions or modifications, may be made as embody what is covered by the appended claims. Furthermore, it may not be essential in all uses of the invention to employ all features thereof conjointly, since various combinations and subcombinations may perhaps at times be advantageously employed.

What is here claimed is:

1. In control means for automatic water softener apparatus embodying valving means having a cycle of operation including the three stages of from service to backwash, from backwash to regeneration, and from regeneration back to service, that improvement comprising, a valve motor arranged to run intermittently during said cycle, a cam wheel driven by said valve motor, said cam wheel having a cam depression, a crank rigid with said wheel and in controlling relation to said valving means, three limit switches each having a follower riding the periphery of said wheel for successively entering said cam depression for stopping the valve motor and said wheel upon the establishment of each of said stages respectively, a timing control motor arranged to run continuously during said cycle and independently of said valve motor, three control discs constantly driven by said timing control motor, three starting switches each having a follower in operative relation to the control discs respectively for successively starting said valve motor to move said crank successively from the service position to the backwash position, then to the regeneration position, then back to the service position, a first of said control discs having a notch in its periphery for receiving a follower of a first of said starting switches to shut off the current to said control motor, means for partially rotating said first control disc to cause the follower of said first starting switch to ride out of said notch and onto the periphery of said first disc to close said first switch to start said control motor and for simultaneously partially rotating a second of said control discs to cause a follower on a second of said switches to be received in a gap in said second disc to close a second of said switches to start said valve motor, said follower on said second switch subsequently riding out of said gap and onto the periphery of said second disc to restart said valve motor whereby the width of said gap determines the duration of the backwash stage, a third of said control discs having a peripheral cam tit for actuating the cam follower of a third of said control switches to again start the valve motor to limit the duration of the regenerative step and to cause the valve motor to return the valving means to service position, said control motor being subsequently stopped when the follower of said first starting switch again drops into the notch in the periphery of said first control disc.

2. The control means of claim 1 wherein the means for partially rotating said first control disc includes a time clock switch for initiating an electric circuit through said control motor.

3. The control means of claim 1 wherein the means for partially rotating the said first control disc includes a lug rigid with said first control disc and a spring retracted plunger for engaging said lug.

4. The control means of claim 1 wherein the width of said gap is adjustable to vary the duration of the backwash stage.

5. The control means of claim 1 wherein the position of said cam tit is adjustable to vary the duration of the regeneration stage.

6. The control means of claim 1 wherein the said switch cooperating with the said second control disc is a double throw switch arranged to close a circuit in either position.

7. In control means for automatic water softener apparatus embodying piston type valving means including a valve stem having a cycle of operation including the three stages of from service to backwash, from backwash to regeneration, and from regeneration back to service, that improvement comprising, a valve motor arranged to run intermittently during said cycle, a cam wheel driven by said valve motor, said cam wheel having a cam depression, a crank rigid with said wheel and in controlling relation to said valving means valve stem, three limit switches each having a follower riding the periphery of said wheel for successively entering said cam depression for stopping the valve motor and said wheel upon the establishment of each of said stages respectively, a timing control motor arranged to run continuously during said cycle and independently of said valve motor, three control discs constantly driven by said timing control motor, three starting switches each having a follower in operative relation to the control discs respectively for successively starting said valve motor to move said crank successively from the service position to the backwash position, then to the regeneration position, then back to the service position, a first of said control discs having a notch in its periphery for receiving a follower of a first of said starting switches to shut off the current to said control motor, means for partially rotating said first control disc to cause the follower of said first starting switch to ride out of said notch and onto the periphery of said first disc to close said first switch to start said control motor and for simultaneously partially rotating a second of said control discs to cause a follower on a second of said switches to be received in a gap in said second disc to close a second of said switches to start said valve motor, said follower on said second switch subsequently riding out of said gap and onto the periphery of said second disc to restart said valve motor whereby the width of said gap determines the duration of the backwash stage, a third of said control discs having a peripheral cam tit for actuating the cam follower of a third of said control switches to again start the valve motor to limit the duration of the regeneration step and to cause the valve motor to return the valving means to service position, said control motor being subsequently stopped when the follower of said first starting switch again drops into the notch in the periphery of said first control disc.

8. The control means of claim 7 wherein the valving means embodies a valve body having a valve bore and a valve stem in said bore, a valve movable on and with respect to said valve stem, a ferrule on the lower end of the valve stem arranged to abut the valve in the lowermost position of the valve on the valve stem, a hollow member carried by the valve body at the lower end of said bore also arranged to abut the valve, said member being in the form of a cup the rim of which is arranged to abut the valve while the interior thereof receives the valve stem and ferrule, said member being adjustable in the valve body to selectively limit downward movement of the valve, but permitting further downward movement of the valve stem, and a spring between the upper end of the valve and an abutment on the valve stem above said valve whereby the valve stem and said ferrule may move downwardly with respect to the valve against the resilience of said spring after the valve has abutted the cup.

9. In control means for water softener apparatus embodying valving means having a cycle of operation including three successive positions of backwash, regeneration, and service, that improvement comprising, a valve motor in controlling relation to said valving means, a cam wheel driven by said valve motor, switches having followers riding said cam wheel for stopping said valve motor successively in each of said valving means positions, a control motor arranged to begin running independently of said valve motor before said valve motor places the valving means in backwash position and to run continuously independently of the valve motor until after the valve motor returns the valving means to service position, control disc means arranged to rotate constantly during operation of said control motor, switches cooperating with said control disc means in controlling relation with said valve motor for starting said valve motor to cause the valve motor to move said valving means successively to backwash, regeneration and service positions, said control disc means including means for stopping said control motor after the valving means has been returned to service position by said valve motor, and means independent of said valve motor for starting said control motor.

References Cited in the file of this patent

UNITED STATES PATENTS

| | | |
|---|---|---|
| 1,914,333 | Staegemann | June 13, 1933 |
| 2,247,964 | Reynolds | July 1, 1941 |
| 2,274,454 | Murphy | Feb. 24, 1942 |
| 2,277,902 | Carbonaro | Mar. 31, 1942 |
| 2,338,667 | Riche | Jan. 4, 1944 |
| 2,507,343 | Lindsay et al. | May 9, 1950 |
| 2,542,390 | Brown | Feb. 20, 1951 |
| 2,689,218 | Waugh | Sept. 14, 1954 |
| 2,699,207 | Russell et al. | Jan. 11, 1955 |
| 2,722,514 | Sloan | Nov. 1, 1955 |
| 2,739,119 | Stoner | Mar. 20, 1956 |
| 2,797,706 | Harrison | July 2, 1957 |